United States Patent [19]
Markus

[11] Patent Number: 5,988,240
[45] Date of Patent: Nov. 23, 1999

[54] LAMELLA GROOVE MILLING TOOL

[75] Inventor: Jaeggi Markus, Sissach, Switzerland

[73] Assignee: Lamello AG, Bubendorf, Switzerland

[21] Appl. No.: 09/064,194

[22] Filed: Apr. 22, 1998

[30] Foreign Application Priority Data

Apr. 22, 1997 [EP] European Pat. Off. ............. 97106621

[51] Int. Cl.⁶ ............................... B27M 1/00; B27C 5/00
[52] U.S. Cl. ............................. 144/136.95; 144/154.5; 144/371; 409/182; 409/218; 409/231
[58] Field of Search ........................... 144/136.95, 154.5, 144/137, 371; 409/218, 231, 182, 137, 180, 181, 178; 74/63

[56] References Cited

U.S. PATENT DOCUMENTS

| 4,627,773 | 12/1986 | Ehnert . | |
|---|---|---|---|
| 4,942,912 | 7/1990 | Gakhar et al. . | |
| 4,971,122 | 11/1990 | Sato et al. . | |
| 4,988,245 | 1/1991 | Fukuda | 144/154.5 |
| 5,273,091 | 12/1993 | Shibata . | |
| 5,694,992 | 12/1997 | Kikuchi | 144/154.5 |

*Primary Examiner*—W. Donald Bray
*Attorney, Agent, or Firm*—Evenson, McKeown, Edwards & Lenahan, PLLC

[57] ABSTRACT

A lamella groove milling tool has a drive shaft receiving the cutter. The drive shaft is arranged to be vertically displaceable with respect to the carriage of the milling tool. The displacement preferably takes place by means of a positioning body which is rotatably connected with the housing by way of a thread and which is connected with the drive shaft. The positioning body has resilient detent devices in order to be able to adjust the rotating position in lockable discrete steps. This achieves reproducible height adjustments of the milling plane of the milling tool.

13 Claims, 4 Drawing Sheets

LAMELLA GROOVE MILLING TOOL

BACKGROUND AND SUMMARY OF THE INVENTION

This application claims the priority of European Application No. 97106621.2, filed Apr. 22, 1997, the disclosure of which is expressly incorporated by reference herein.

The present invention relates to a lamella groove milling tool and, more particularly, to a lamella groove milling tool having a housing with a motor, a cutter coupled with the motor by way of a gear, a longitudinally displaceable carriage having an opening for the emerging of the cutter, and a plane support surface, as well as a stop plate, which can be adjusted concerning the distance and the angle with respect to the milling plane formed by the cutter.

Lamella groove milling tools are used for making grooves into which lamellae are inserted as connection elements between wood elements. This connecting technique results in very stable and stiff connections which have a high strength.

A lamella groove milling tool of this type is known, for example, from European Patent document EP 0 420 498. In it, a lamella groove milling tool is described which consists of a housing having a motor. The motor drives a rotatable cutter which can be moved out of and withdrawn into an opening of a sliding subassembly connected with the housing. In this case, the sliding subassembly and the housing are movably arranged with respect to one another, whereby the cutter is movably arranged in the so-called sectional plane with respect to the opening of the sliding subassembly. The sliding subassembly has a surface area which is aligned in parallel to the sectional plane and a stop face which is aligned perpendicularly thereto and in which the mentioned opening is arranged. The distance between the surface area and the sectional plane, as a rule, is selected according to the standard distance defined for groove-type connections and cannot be changed. In order to now produce a groove at a distance which differs from the standard distance with respect to an edge on a workpiece to be machined, another stop plate is also provided on the stop face and can be swivelled with respect to the stop face in an angular range of 90°, the distance between the swivelling axis and the sectional plane being adjustable. However, for implementing these grooves, the tool must be held or guided in a swivelled manner.

The disadvantage of this known construction of a lamella groove milling tool is the fact that, on the one hand, it requires relatively high expenditures to maintain the permissible tolerance with respect to the distance between the sectional plane and the surface area and, on the other hand, for all groove machining which deviates from the standard distance, the use of the adjustable stop face is required. This results in high expenditures and, as the result of the construction of this stop face, is also connected with high tolerances, particularly where a large number of pieces require the machining of grooves. In addition, an adjustment which was selected and was then changed can no longer be reproduced in a precise manner.

It is an object of the present invention to find a lamella groove milling tool of the above-described type which can be adapted in a simple and fast manner to different application requirements.

According to the invention, this object is achieved by a lamella groove milling tool having a housing with a motor, a cutter coupled with the motor by way of a gear, a longitudinally displaceable carriage having an opening for the emerging of the cutter, and a plane support surface, as well as a stop plate, which can be adjusted concerning the distance and the angle with respect to the milling plane formed by the cutter. The cutter is arranged on a drive shaft which is essentially vertically displaceable along its axis with respect to the support surface.

In the case of the lamella groove milling tool further developed according to the invention, the distance between the milling plane and the support surface can advantageously be adjusted. On the one hand, the manufacturing of the lamella groove cutting tool can be simplified in this manner in that the distance to be maintained within a certain tolerance can be adjusted in the factory in the case of the finished tool by a corresponding positioning of the drive shaft in a very simple manner. This eliminates the conventionally required interventions into the tools not meeting the tolerance. Further, the user can also freely select a basic distance which differs from the provided and adjusted standard distance and is advantageous according to the application.

Special embodiments of the invention are further described herein.

Another advantage of the present invention is the fact that different adjustments can be reproduced an arbitrary number of times with high precision by means of the preferred embodiment with the lockable discrete adjusting devices. This was not so in the case of the conventionally known devices where the adjustments took place without exception in a continuous manner and one clamping fixation respectively was used. As a result of the fact that, according to the invention, lockable, that is, discrete positions can be adjusted, any selected position can be reproduced again and again in a precise and reliable manner. This also leads to a higher precision during the machining of the workpieces. In addition, a desired position can also be adjusted more rapidly since the respective detent position is precisely indicated and a continuously adjustable marking must not be coordinated with an adjusting scale.

Other objects, advantages and novel features of the present invention will become apparent from the following detailed description of the invention when considered in conjunction with the accompanying drawings.

DETAILED DESCRIPTION OF THE DRAWINGS

Figure 1:
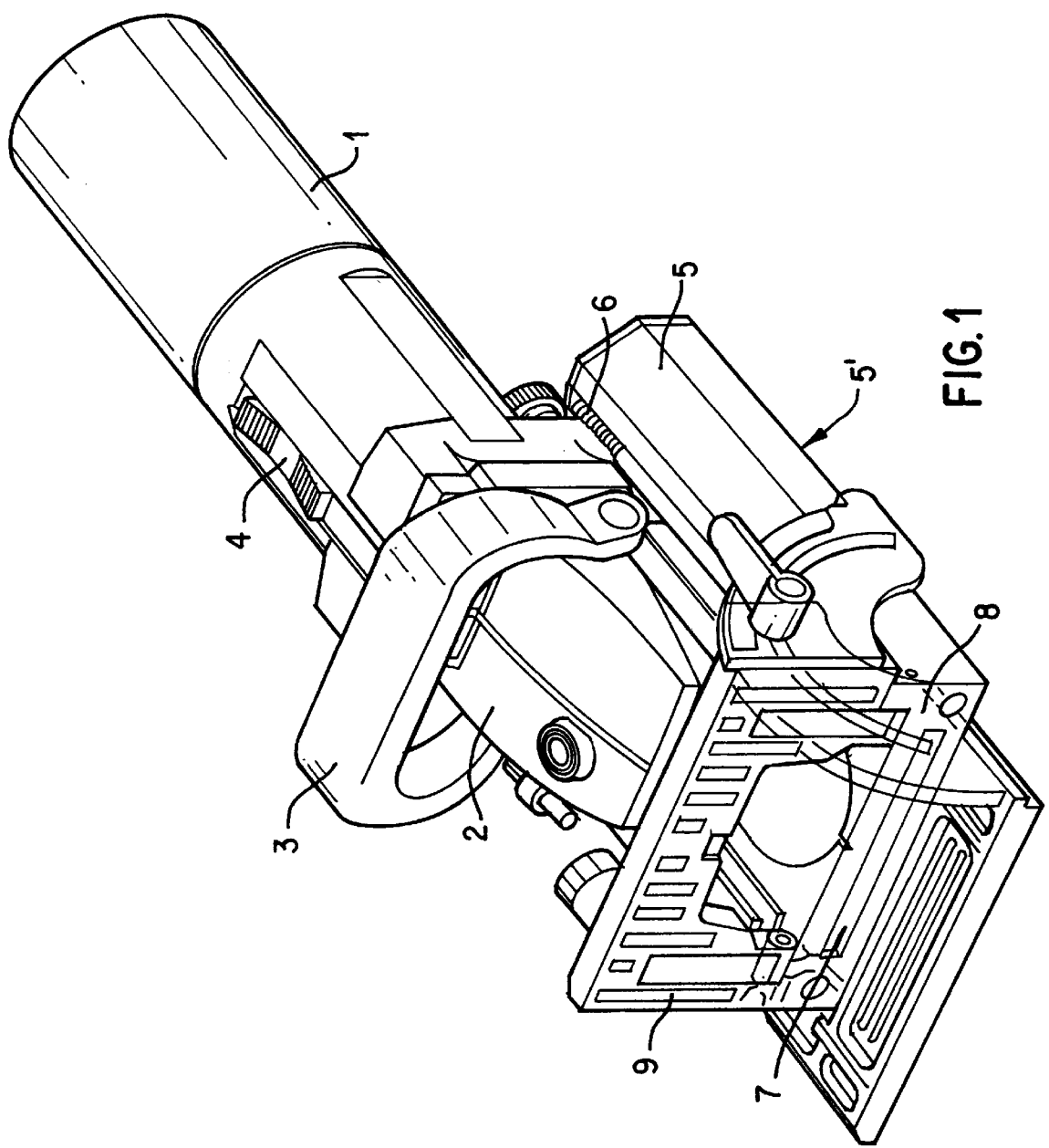
FIG. 1 is a schematic view of a conventional lamella groove milling tool.

FIG. 1 is a view of a conventional electrically driven lamella groove milling tool. The motor part 1 is flanged to a housing 2 which contains the gear for connecting the milling plate with the motor. A handle 3 for operating the milling tool as well as a switch 4 for switching the motor 1 on and off are also mounted on the housing 2. By way of guide surfaces, the housing 2 is displaceably connected with the carriage 5. In this case, a restoring device, for example, in the form of a spring 6, moves the housing 2, in each case, automatically into the inoperative position illustrated in FIG. 1 with respect to the carriage 5. In this position, the milling plate is completely sunk in the interior of the carriage 5 and the milling opening 7 is exposed.

The carriage 5 has a plane support surface 5' which extends in parallel to the milling plane formed by the milling plate. The front surface 8 of the carriage 5 is constructed perpendicularly with respect to the support surface 5' also in a plane fashion. A stop plate 9, which is swivellably disposed in the carriage 5, together with the front surface 8, forms the front stop of the milling tool in the illustrated vertically swivelled position.

For example, for providing a lamella groove, the milling tool with the support surface 5' is now placed on a work table and is pressed with the front stop against a workpiece also placed on the work table. As soon as the front stop rests against the workpiece, the housing is displaced against the spring force of the restoring device in the carriage 5 against the workpiece, whereby the milling plate emerges from the milling opening 7, dips into the workpiece and thus makes the desired groove.

In the workpiece, such a groove is always made in parallel to the work table surface or support surface 5' at the height of the milling plane defined by the tool. This level was standardized and defined for lamella groove connections. One problem during the manufacturing of such milling tools is the fact that the height of the milling plane must in each case be examined during the manufacturing of the tool with respect to meeting a certain tolerance and this tolerance must be readjusted if the deviation is too large. In the case of conventional tools, this requires high expenditures which has a negative effect also on average production costs.

Figure 2:
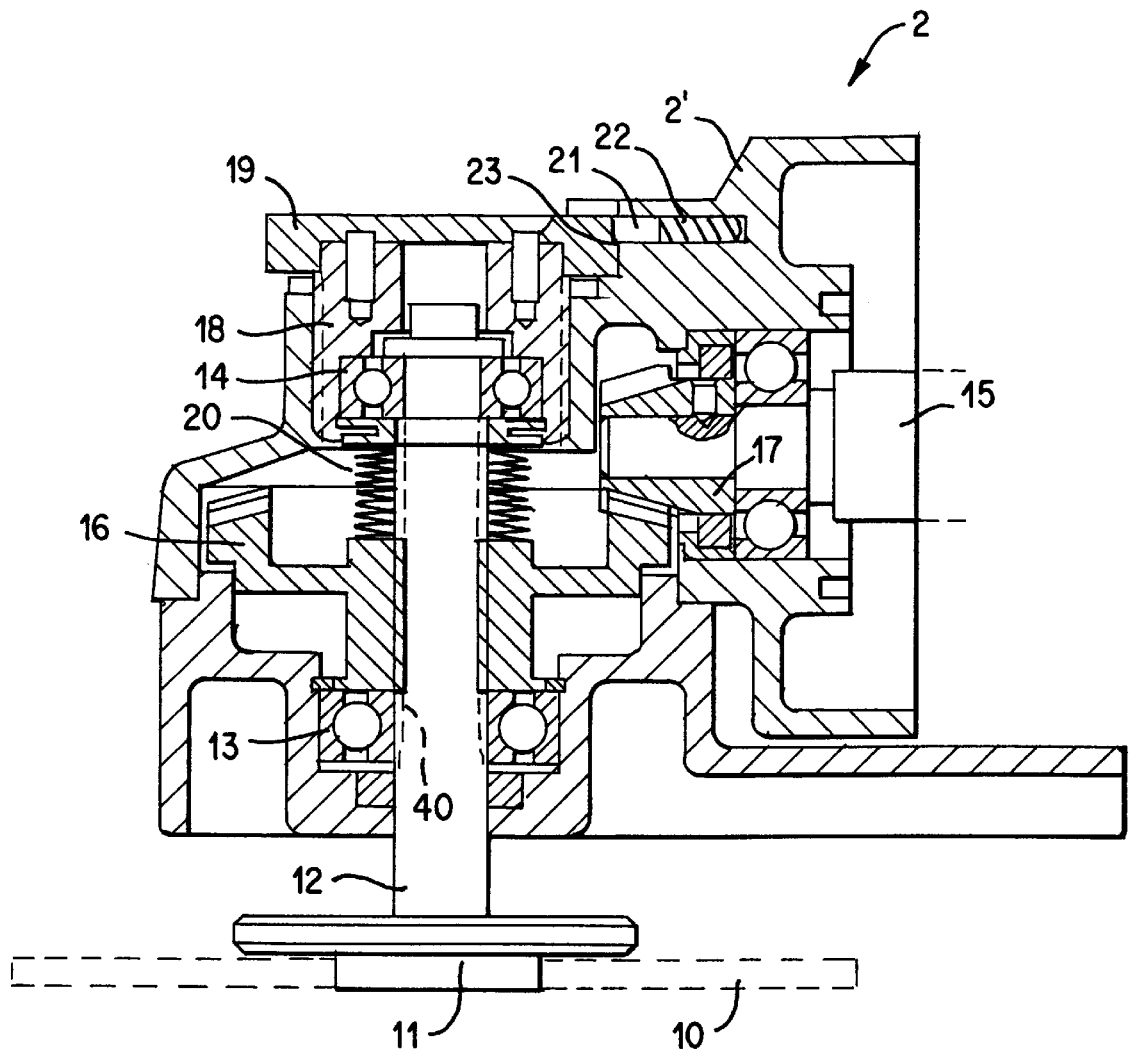
FIG. 2 is a cross-sectional view of the gear area of a lamella groove milling tool according to the invention.

According to the invention, the milling planes are constructed such that they can be adjusted by the operator on the tool itself, as illustrated in detail on an embodiment shown in the sectional drawing of FIG. 2. This figure shows a cross-section through the gear housing 2' of the housing 2 of a milling tool according to the invention. The flange 11 (cutter mount) receiving the cutter 10 is arranged on the lower end of the vertically standing drive shaft 12. This drive shaft 12 is rotatably disposed in the gear housing 2', for example, by means of two bearings 13, 14. The drive shaft 12 is connected with the motor shaft 15 by way of the ring gear 16 and the pinion gear 17.

In order to be able to adjust the height of the cutter 10, the upper bearing 14 of the drive shaft 12 is arranged in a positioning body 18. The positioning body 18 is rotatably arranged in a gear housing 2' preferably by means of a thread and, on its upper end, has a set wheel 19 by means of which the positioning body 18 can be rotated. By the rotation of the positioning body 18, its position is vertically displaced and so is therefore the drive shaft 12 which is fixedly connected with the upper bearing 14. The drive shaft 12 is longitudinally slidably pushed into the internal bearing cage of the lower bearing 13. The ring gear 16 is also longitudinally slidably pushed onto the drive shaft 12 and, for example, has an internal toothing which engages in longitudinal grooves of the drive shaft 12 and establishes a form-locking connection between the grooves 40 and the internal toothing. Such a form-locking groove tooth connection protects against torsion between the ring gear and the shaft. Between the ring gear 16 and the upper bearing 14, a spring element, for example, consisting of cup springs 20, is advantageously arranged which braces the two bearings 13 and 14 as well as the ring gear 16 with respect to one another. These cup springs 20 are capable of compensating the change of length which occurs when the height of the drive shaft 12 or of the cutter 10 is adjusted.

Preferably, the set wheel 19 engages with a resilient detent device, for example, in the form of a pin 21. This pin 21 is pressed against the edge of the set wheel 19 by means of a spring 22 and can engage in grooves 23 on the edge of the set wheel 19. The grooves in parallel to the axis of the drive shaft. This provides discrete height adjusting positions for the location of the cutter 10 at the angular positions defined by these grooves 23. The advantage of these discrete positions is the fact that certain height positions can be rapidly and easily reproduced with very high precision.

In the case of such a groove milling tool further developed according to the invention, the required basic adjustment of the height of the milling plane can now easily be adjusted within the required tolerances on the finished produced tool by rotating the positioning body 18. Then, for example, the height adjusting scale on the set wheel 19 can be aligned in the zero position with the corresponding marking on the housing 2 and 2' and can be fixed.

However, for using the tool, the user can also arbitrarily adjust the distance of the milling plane from the support surface 5' within the limits defined by the height of the milling opening 7. These adjustments can also advantageously be precisely reproduced again by using the locking detent device.

Figure 3:
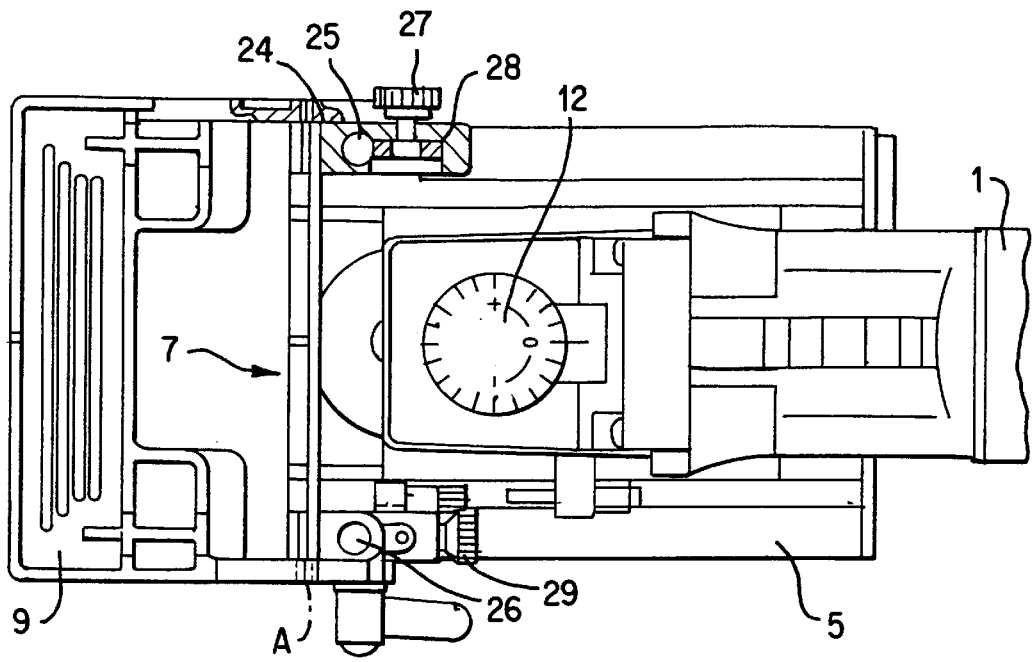
FIG. 3 is a view of a preferred embodiment of a lamella groove milling tool according to the invention.
Figure 4:
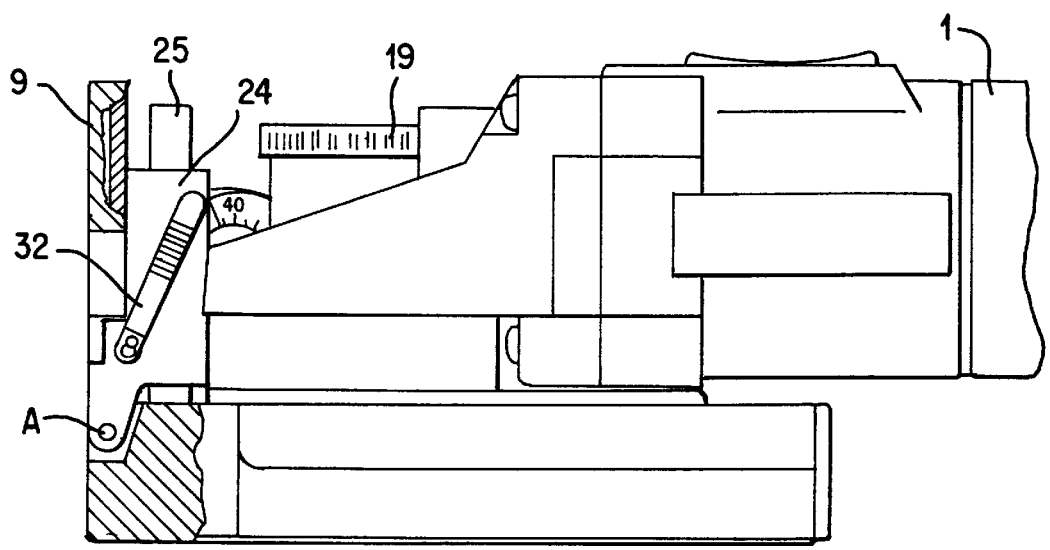
FIG. 4 is a lateral view of the lamella groove milling tool according to FIG. 3.

If the stop plate 9 is to be used nevertheless at a defined angular position and height with respect to the carriage 5, it is preferably provided according to the invention to also provide detent devices which have springs, as schematically illustrated in the top view of FIG. 3. Thus, the stop plate 9 is swivellable about its axis A disposed in a stop carriage 24. This stop carriage 24 is vertically slidably disposed in two columns 25 and 26. In a mutually parallel aligned manner, these columns 25 and 26 are arranged offset on the carriage 5 beside and behind the milling opening 7. In this case, the columns 25, 26 each have one section respectively which is constructed in a toothed-rack-type manner and in which a gear wheel 28 engages on one side which is connected with a set wheel 27. By means of this set wheel 27, the stop carriage 24 can be vertically slid by the engaging of the gear wheel 28 in the toothing of the column 25. On the other side, a pin element 29 having a spring engages in the toothing of the column 26. The tip of the pin element 29 is constructed such that it engages in the toothing of the column and detachably fixes it in the manner of a resilient locking. With the use of a suitable scale on the set wheel 27, the vertical position of the stop carriage 24 can now be adjusted at definable discrete distances with respect to the carriage 5 in a reproducible manner. The illustrated arrangement is shown in FIG. 4 also as a lateral view.

Figure 5:
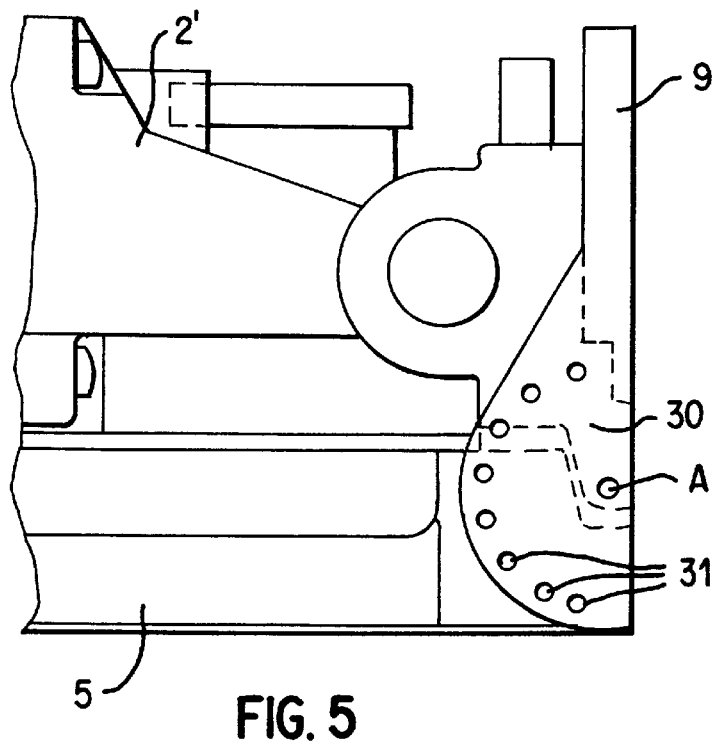
FIG. 5 is a longitudinal sectional view of the head area of the lamella groove milling tool according to FIG. 4.
Figure 6:
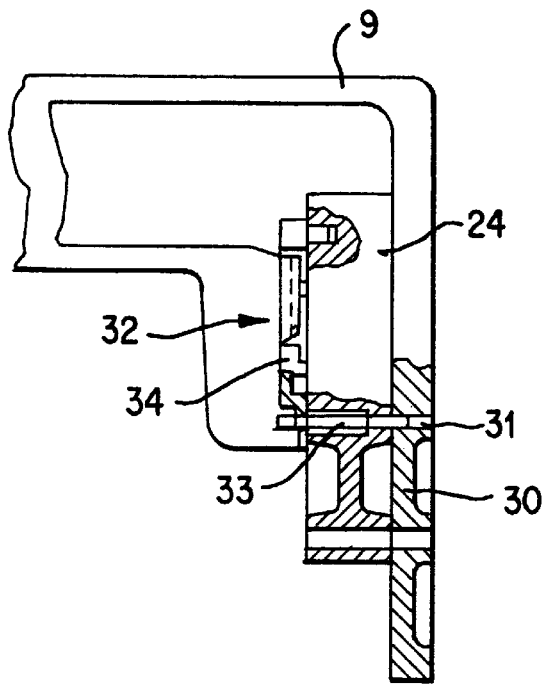
FIG. 6 is a longitudinal sectional view of the stop carriage in the area of a column of the lamella groove milling tool according to FIG. 3.

Preferably, the swivel angle of the stop plate 9 is also constructed to be adjustable in discrete reproducible steps by means of detent devices 32 having a spring. For this purpose, the stop plate 9 has, for example, a semicircular rib 30 which, at a radius around the axis of rotation A, has detent points 31, such as bores, at definable distances, as illustrated in the sectional view of FIG. 5. A pin 33 of the detent device 32, which has a spring, can analogously to the above-described manner detachably lock into these detent points 31 in order to fix a discrete angular position of the stop plate 9 in a reproducible manner. For example, the detent device 33 may have a bendable actuating arm 34 which is made of a resilient plastic material and by means of which the pin 53 can be pulled against the spring force out of the engagement in the detent point 31, as shown in FIG. 6.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Lamella groove milling tool, comprising:

a housing;

a motor non-moveably arranged within the housing;

a carriage having an opening located at one longitudinal end of the carriage, as well as a bottom surface defining a plane support surface for the tool, the housing being arranged on the carriage so as to be displaceable along a longitudinal axis of the carriage;

a drive shaft adapted to mount a cutter for the tool, the drive shaft being rotationally driven by the motor via a gear to rotate the cutter which moves in and out of the opening of the carriage by longitudinal movement of the housing;

a stop plate arranged at the one longitudinal end of the carriage, the stop plate being adjustable with respect to a distance and an angle relative to a cutting plane of the cutter; and wherein the drive shaft is vertically displaceable relative to both the plane support surface of the carriage and the housing and motor in order to adjust the cutting plane of the tool.

2. Lamella groove milling tool according to claim 1, further comprising:

a motor shaft coupled with the motor;

a ring gear having a hub, said ring gear being driven via the motor shaft; and wherein the drive shaft engages with the hub of the ring gear so as to be longitudinally displaceable, whereby the engagement between the hub and the drive shaft protects against torsion between the hub and the drive shaft.

3. Lamella groove milling tool according to claim 1, wherein at an end of the drive shaft situated opposite the cutter, a positioning body is disposed in a rotational manner which is connected in a vertically adjustable fashion in an axial direction of the drive shaft with the housing.

4. Lamella groove milling tool according to claim 2, wherein at an end of the drive shaft situated opposite the cutter, a positioning body is disposed in a rotational manner which is connected in a vertically adjustable fashion in an axial direction of the drive shaft with the housing.

5. Lamella groove milling tool according to claim 3, wherein the connection is by way of a thread.

6. Lamella groove milling tool according to claim 3, wherein the positioning body comprises a spring-operated detent device which interacts with the housing such that the positioning body is detachably fixed relative to the housing in defined rotational positions.

7. Lamella groove milling tool according to claim 4, wherein the positioning body comprises a spring-operated detent device which interacts with the housing such that the positioning body is detachably fixed relative to the housing in defined rotational positions.

8. Lamella groove milling tool according to claim 6, wherein the detent device is formed by a pin which is resiliently disposed in a bore of the housing arranged radially with respect to the positioning body, which pin engages in correspondingly arranged grooves of the positioning body.

9. Lamella groove milling tool according to claim 7, wherein the detent device is formed by a pin which is resiliently disposed in a bore of the housing arranged radially with respect to the positioning body, which pin engages in correspondingly arranged grooves of the positioning body.

10. Lamella groove milling tool according to claim 1, wherein the stop plate is swivellably arranged on a stop carriage which is vertically displaceably guided by two columns which are arranged in parallel, extend perpendicular to the milling plane and are connected with the carriage behind an exit opening for the cutter mounted on the tool, one column having a toothing in which a gear wheel engages which is connected with an additional set wheel, and the other column having one of indentations and a toothing into which a detent device is lockable which is arranged on the stop carriage and has a spring.

11. Lamella groove milling tool according to claim 1, wherein the stop plate is swivellable by more than 90° about a swivel axis arranged on a stop carriage which is vertically displaceable with respect to the milling plane.

12. Lamella groove milling tool according to claim 11, wherein the stop plate has at least one rib which is perpendicularly aligned with respect to the stop face and on which indentations are provided which are arranged at a radius around the swivel axis, and further wherein a detent element exists on the stop carriage and is lockable into said indentations.

13. A lamella groove milling tool, comprising:

a housing;

a motor non-movably arranged within the housing;

a carriage having a bottom surface defining a plane support surface for the tool, the housing being arranged on the carriage in a longitudinally displaceable manner;

a drive shaft adapted to mount a cutter for the tool;

means for rotationally driving the drive shaft via the motor to rotate the cutter;

a stop plate arranged at one longitudinal end of the carriage, the stop plate being adjustable with respect to a distance and an angle relative to a cutting plane of the cutter; and means for vertically adjusting the drive shaft independently of the housing and motor relative to the plane support surface of the carriage to vary a cutting plane of the cutter.

* * * * *